US010700528B2

(12) United States Patent
Kangas et al.

(10) Patent No.: US 10,700,528 B2
(45) Date of Patent: Jun. 30, 2020

(54) METHOD FOR CONTROLLING ELECTRIC POWER CONVERSION SYSTEM AND CONTROL ARRANGEMENT FOR ELECTRIC POWER CONVERSION SYSTEM

(71) Applicant: ABB Schweiz AG, Baden (CH)

(72) Inventors: Jani Kangas, Vantaa (FI); Tomi Riipinen, Järvenpää (FI)

(73) Assignee: ABB Schweiz AG, Baden (CH)

( * ) Notice: Subject to any disclaimer, the term of this patent is extended or adjusted under 35 U.S.C. 154(b) by 71 days.

(21) Appl. No.: 15/897,394

(22) Filed: Feb. 15, 2018

(65) Prior Publication Data

US 2018/0233921 A1    Aug. 16, 2018

(30) Foreign Application Priority Data

Feb. 15, 2017   (EP) .................................... 17156279

(51) Int. Cl.
*H02J 3/38*         (2006.01)
*G05B 19/042*    (2006.01)
(Continued)

(52) U.S. Cl.
CPC .......... *H02J 3/385* (2013.01); *G05B 19/0426* (2013.01); *H02J 3/383* (2013.01);
(Continued)

(58) Field of Classification Search
CPC ......... H02M 2007/4822; H02M 7/493; H02M 7/77; H02M 2001/0067; H02M 2001/009;
(Continued)

(56) References Cited

U.S. PATENT DOCUMENTS

2012/0063179 A1*   3/2012   Gong ..................... H02M 1/12
                                                                    363/40
2013/0250635 A1*   9/2013   Sivakumar ............. H02J 3/383
                                                                    363/71
(Continued)

FOREIGN PATENT DOCUMENTS

CN       102549873 B       7/2012
CN       202513588 U      10/2012
(Continued)

OTHER PUBLICATIONS

Compiler vs Interpreter: Complete Difference Between Compiler and Interpreter, https://www.guru99.com/.*
(Continued)

*Primary Examiner* — Alex Torres-Rivera
(74) *Attorney, Agent, or Firm* — Taft Stettinius & Hollister LLP; J. Bruce Schelkopf

(57) ABSTRACT

A method and a control arrangement for an electric power conversion system including a plurality of electric power converters, the control arrangement configured to collect data related to the electric power conversion system, determine an optimal configuration for each one of the electric power converters of the electric power conversion system on the basis of collected data through a simulation of the electric power conversion system generate, for each one of the electric power converters, a source code for a firmware of the electric power converter on the basis of the determined optimal configuration for the electric power converter in question, and re-program each one of the electric power converters with the respective source code generated for the electric power converter in question.

17 Claims, 5 Drawing Sheets

(51) Int. Cl.
*H02M 3/00* (2006.01)
*H02M 7/00* (2006.01)
*H02M 11/00* (2006.01)
*H02M 5/00* (2006.01)
*H02J 13/00* (2006.01)
*H02M 1/00* (2006.01)

(52) U.S. Cl.
CPC ............ *H02J 13/0006* (2013.01); *H02M 3/00* (2013.01); *H02M 5/00* (2013.01); *H02M 7/00* (2013.01); *H02M 11/00* (2013.01); *G05B 2219/23146* (2013.01); *G05B 2219/23456* (2013.01); *H02J 2203/20* (2020.01); *H02M 1/00* (2013.01); *H02M 2001/0012* (2013.01); *Y02E 10/563* (2013.01); *Y02E 40/72* (2013.01); *Y04S 10/123* (2013.01)

(58) Field of Classification Search
CPC ................... H02M 1/02; H02M 11/00; H02M 2001/0012; H02J 3/385; H02J 13/0006; H02J 3/383; H02J 2003/007; G05B 19/0426; G05B 2219/23456; G05B 2219/23146; Y04S 10/123; Y02E 40/72; Y02E 10/563
USPC ...................................................... 363/65, 71
See application file for complete search history.

(56) References Cited

U.S. PATENT DOCUMENTS

| | | | |
|---|---|---|---|
| 2016/0259314 A1 | 9/2016 | Dhople et al. | |
| 2016/0281607 A1 | 9/2016 | Asati et al. | |
| 2016/0329716 A1* | 11/2016 | Inoue | H02J 3/383 |
| 2016/0344191 A1 | 11/2016 | Sivakumar et al. | |
| 2018/0069403 A1* | 3/2018 | Shuy | H02J 7/35 |

FOREIGN PATENT DOCUMENTS

| | | |
|---|---|---|
| CN | 104485692 A | 4/2015 |
| WO | 2015192110 A1 | 12/2015 |
| WO | WO 2017016617 A1 | 2/2017 |

OTHER PUBLICATIONS

European Patent Office, Extended Search Report issued in corresponding Application No. 17156279.6, dated Jun. 27, 2017, 8 pp.
Office Action issued in Australian Application No. 2018200827 dated Jun. 29, 2018 (11 pages).
Indian Patent Office, Official Action issued in corresponding Indian application No. 201844005326, dated Oct. 22, 2019, 5 pp.
European Patent Office, Official Action issued in corresponding EP application No. 17156279.6, dated Feb. 4, 2020, 6 pp.
Weaver, W., et al., Real-Time Hardware-in-the-Loop Simulator for Optimal Dc Microgrid Control Development, Michigan Technological University, IEEE, 978-1-4799-2147-8114, 2014, 6 pp.

* cited by examiner

METHOD FOR CONTROLLING ELECTRIC POWER CONVERSION SYSTEM AND CONTROL ARRANGEMENT FOR ELECTRIC POWER CONVERSION SYSTEM

FIELD OF THE INVENTION

The present invention relates to a method for controlling an electric power conversion system and to a control arrangement for an electric power conversion system.

BACKGROUND OF THE INVENTION

Electric power converters are devices that enable the conversion of electric energy between AC (alternating current) and DC (direct current) and/or from one voltage level to another and/or from one frequency to another, for example. Examples of such electric power converters include a rectifier, an inverter and a frequency converter, for example.

As an example, an inverter is an electrical device enabling conversion of DC power from a DC power source to AC power. The term 'inverter' generally refers to an electronic device or circuitry that is able to convert direct current to alternating current. An example of the inverter is a semiconductor bridge implemented by means of controllable semiconductor switches, such as IGBTs (Insulated-gate Bipolar Transistor) or FETs (Field-Effect Transistor), which are controlled according to a modulation or control scheme used.

One example of an electric system comprising one or more inverters is a photovoltaic system, such as a photovoltaic power plant or generator, in which one or more photovoltaic panels supply DC power to the inverter which converts the DC power to AC power, which may further be supplied to various AC loads via an AC network, for example. Large photovoltaic power plants may comprise a plurality of parallel inverters each receiving DC power from an array of photovoltaic panels.

Often power plants, such as photovoltaic power plants, or other systems utilizing inverters or other electric power converters, may comprise converters which are made-to-order manufactured or mass manufactured. As a result, they may be intentionally made very similar to each other and possibly only occasionally some special modifications or alterations are done for individual converters.

A problem related to such a system is that the system as a whole may not be sufficiently optimized and comprises a group of merely sub-optimized electric power converters. Moreover, such a system may not able to properly or adequately adapt to new situations or circumstances affecting the system.

BRIEF DESCRIPTION OF THE INVENTION

An object of the present invention is thus to provide a method and an apparatus for implementing the method so as to overcome the above problem or at least so as to alleviate the problem or to provide an alternative solution. The objects of the invention are achieved by a method, a computer program product, an arrangement, and a system which are characterized by what is stated in the independent claims. The preferred embodiments of the invention are disclosed in the dependent claims.

The invention is based on the idea of simulating an electric power conversion system, which comprises a plurality of electric power converters, by using obtained data related to the electric power conversion system, and then re-programming the electric power converters on the basis of the simulation such that an optimal configuration for each one of the electric power converters of the electric power conversion system is achieved.

An advantage of the solution of the invention is that the electric power conversion system can be better optimized to prevailing conditions.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

The application of the various embodiments described herein is not limited to any specific system, but they can be used in connection with various electric power conversion systems comprising electric power converters. Moreover, the use of the various embodiments described herein is not limited to systems employing any specific fundamental frequency or any specific voltage level, for example.

Figure 1:
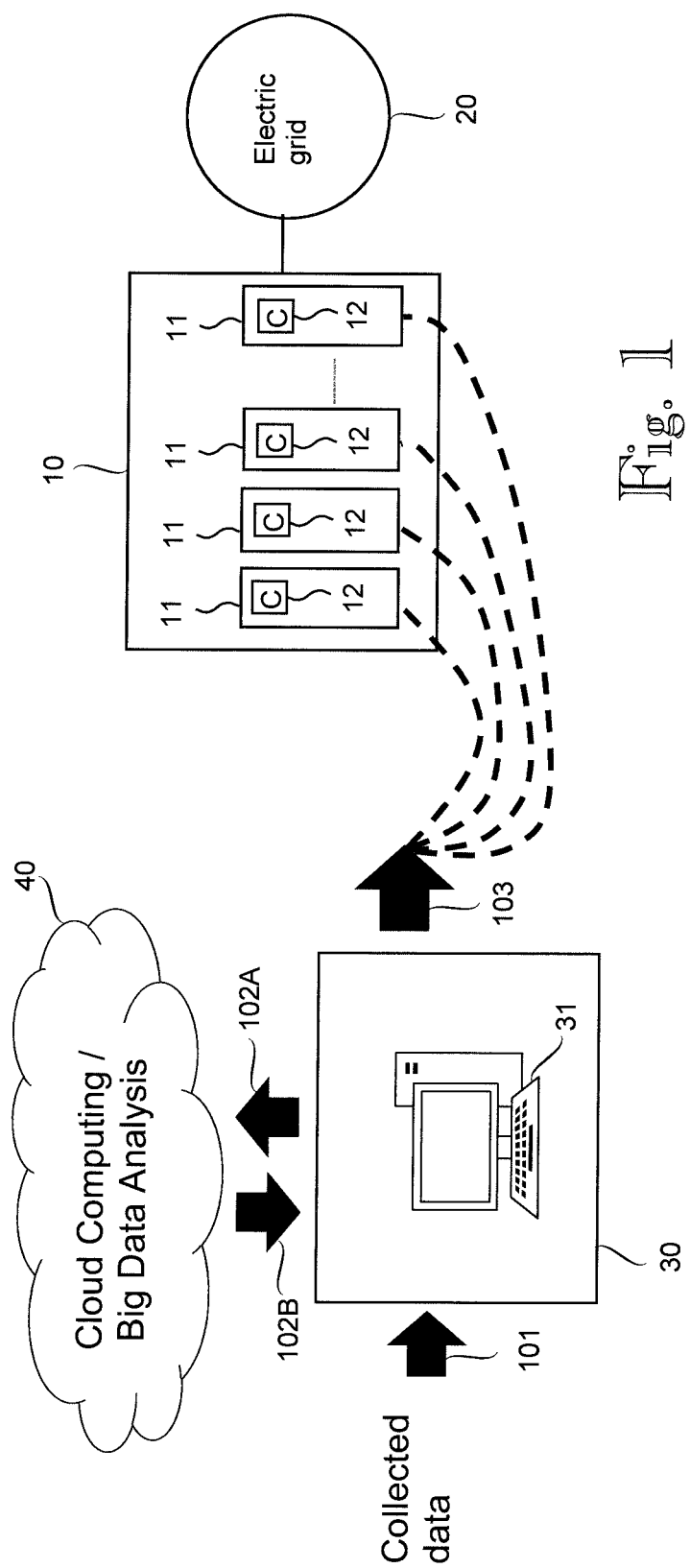
FIG. 1 is a diagram of an arrangement according to an embodiment.

FIG. 1 illustrates a simplified example of an arrangement for controlling an electric power conversion system 10 according to an embodiment. The figure shows only components necessary for understanding the invention. The electric power conversion system 10 may be any kind of electric power conversion system comprising a plurality of electric power converters 11. As an example, the power conversion system 10 could be a photovoltaic power plant or another kind of power plant supplying an electric grid 20, such as an AC network, or merely a power conversion arrangement for such a photovoltaic power plant or another kind of power plant. The electric power converters 11 of the power conversion system 10 can be any kind of electric power converters, such as inverters, rectifiers, frequency converters, or a combination thereof, for instance. The electric power converters 11 preferably each comprise a controller 12 comprising at least one processor used for controlling the normal operation of the converter. Such a controller 12 may further comprise a memory. The term processor generally refers to a processing unit, such as a microprocessor, a general purpose DSP (Digital Signal Processor) or a field-programmable gate array (FPGA), that is capable of data processing. The controller 12 of each electric power converters 11 preferably comprises at least a firmware of the electric power converter for its operation to control the converter. The controllers 12 of the electric power converters 11 may further comprise other type of software and data used for the operation of the converters. The example of FIG. 1 further shows a control arrangement 30 which can be used for controlling the electric power conversion system 10. The control arrangement 30 may comprise one or more computers 31 or corresponding digital signal processing (DSP) equipment, for example. Moreover, the example of FIG. 1 further shows a cloud computing system 40 which may be connected to the control arrangement 30 or be part of the control arrangement 30.

According to an embodiment, the controlling of the electric power conversion system 10 comprises collecting data related to the electric power conversion system 10. Such data related to the electric power conversion system 10 may comprise data of the electric power conversion system 10 and/or data of an electric system 20 supplied by the electric power conversion system 10, and/or data of an electric system supplying the electric power conversion system 10, for example. In the example of FIG. 1, the control arrangement 30 may receive at least part of the collected data 101 from respective entities, such as the electric power conversion system 10, an electric system 20 supplied by the electric power conversion system 10, and/or an electric system supplying the electric power conversion system 10, for example. The collected data may comprise measured data and the control arrangement 30 may be configured to perform at least some measurements in order to obtain such measured data. For this, the control arrangement 30 may comprise suitable measuring arrangements. Then, according to an embodiment, an optimal configuration is determined for each one of the electric power converters 11 of the electric power conversion system 10 on the basis of the collected data through a simulation of the electric power conversion system 10. In the example of FIG. 1, the control arrangement 30 may perform the simulation. The control arrangement 30 may utilize a possible cloud computing system 40 for this purpose, for example. For example, some data can be transferred 102A from the control arrangement 30 to the cloud computing system 40 for the processing thereof and resulting data or other data can be obtained 102B by the control arrangement 30 from the cloud computing system 40. According to an embodiment, the optimal configuration for each one of the electric power converters 11 of the electric power conversion system 10 is such that optimizes a power output of the electric power conversion system 10. As an example, the configuration for the electric power converter 11 may comprise one or more operational values of the converter, a current controller type of the converter, and/or a modulator type of the converter. Then, according to an embodiment, a source code for a firmware of the electric power converter is generated 11, for each one of the electric power converters 11, on the basis of the determined optimal configuration for the electric power converter in question, and each one of the electric power converters are re-programmed with the respective source code generated for the electric power converter in question. In the example of FIG. 1, the control arrangement 30 may perform such generation of the source code for each one of the electric power converters 11 and the re-programming 103 of the electric power converters 11. The way how the source code is generated and how the electric power converters 11 are re-programmed depends on the type and architecture of the control system in each one of the electric power converters 11 and may hence vary. According to an embodiment, the electric power conversion system is kept running at least during the collection of the data and after re-programming of the electric power converters 11. According to an embodiment, the above-described procedure according to the various embodiments may be performed at predetermined intervals and/or in response to one or more predetermined conditions being fulfilled.

Figure 2:
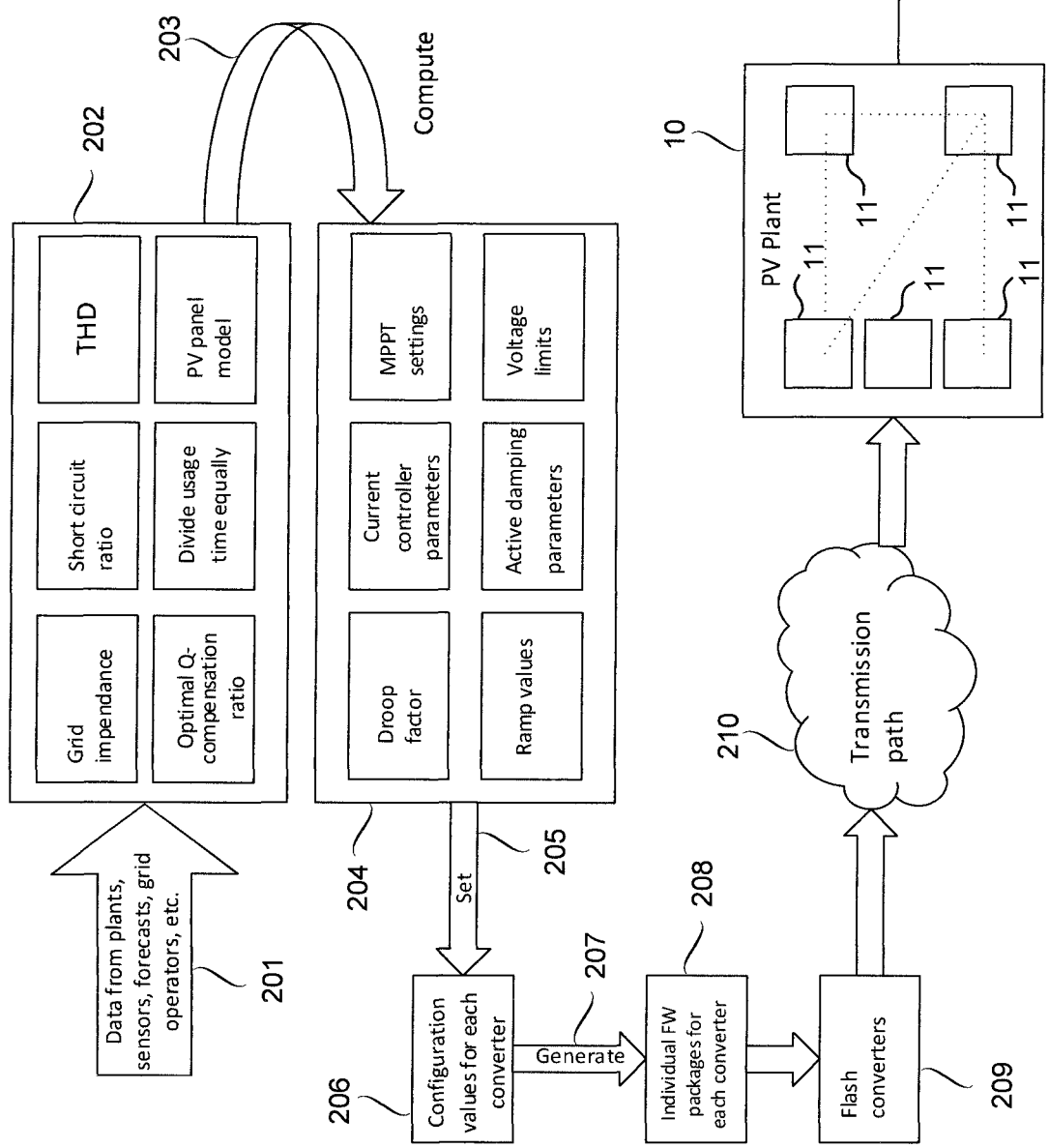
FIG. 2 is a diagram according to an embodiment.

FIG. 2 shows a diagram of an exemplary simulation based firmware generation for an electric power conversion system 10, such as a PV plant, according to an embodiment. First data 202 related to the electric power conversion system 10 is collected 201. In the example of FIG. 2, the collected data 202 may comprise data from plants, such as the PV plant 10 in question, and/or other plants connected to the PV plant 10 in question either directly or via a network, such as the electric grid 20. Furthermore, such data may comprise data from various sensors, forecast data, and data from electric grid 20 operators, for example. As shown in the example of FIG. 2, the data 202 may comprise various data of the electric power conversion system 10 and/or of an electric system 20 supplied by the electric power conversion system and/or data of an electric system supplying the electric power conversion system, such as a grid impedance, a short circuit ratio, a THD (Total Harmonic Distortion), an optimal Q (reactive power) compensation ratio and/or a PV panel model. Next an optimal configuration 204 for each one of the electric power converters 11 of the electric power conversion system 10 are determined 203 on the basis of the collected data 202 through a simulation of the electric power conversion system. Generally, such a configuration 204 for the electric power converter 11 may comprise or may be defined by one or more operational values of the converter, a current controller type of the converter, and/or a modulator type of the converter. As shown in the example of FIG. 2, the configuration 204 for each one of the electric power converters 11 may comprise a droop factor, current controller parameters, MPPT (Maximum Power Point Tracking) settings, ramp values, active damping parameters and/or voltage limits, for example. It should be noted that the type and contents of the collected data 202 as well as the type and contents of the configuration 204 may vary and may depend on the type of electric power converters 11 and the type of the system(s) 10, 20, for example. After determining the configuration 204 for each one of the electric power converters 11, corresponding configuration values 206 may be set 205 for each converter, and individual firmware packages 208 may be generated 207 for each converter. The electric power converters 11 can then be re-programmed 209 with their respective firmware packages via a suitable transmission path 210. According to an embodiment, the re-programming of each one of the electric power converters 11 comprises re-programming the controller 12 of each one of the electric power converters 11. In the example of FIG. 2, any of the steps up to step 209 can be performed by using a control arrangement 30 or a cloud computing system 40 as shown in FIG. 1, for example.

In the following some exemplary simulation based scenarios are given for a situation in which the electric power converters 11 each comprise an inverter. These exemplary scenarios could be used individually, or some or all of them together:

1) Grid impedance→droop factor

The grid impedance may be estimated by simulations and a droop factor of the individual inverter can be computed based on such simulated results. A corresponding firmware package can be created for and sent to each individual inverter based on the simulated grid impedance seen in an output of the inverter.

2) Grid impedance→current controller parameters

The grid impedance may be estimated by simulations and current control parameters (bandwidth, grid resonance controller frequencies, and/or active damping parameters, for example) of an individual inverter can be computed based on such simulated results. A corresponding firmware package can be created for and sent to each individual inverter based on the simulated grid impedance seen in the output of the inverter.

3) Short circuit ratio→current controller parameters

The short circuit ratio (SCR) may be estimated by simulations and current control parameters (bandwidth, loop gain and/or active damping parameters, for example) of an individual can be is computed based on such simulated results. A corresponding firmware package can be created for and sent to each individual inverter based on the short circuit ratio seen in the output of the inverter. The SCR is related (not directly) to the grid impedance.

4) THD—MPPT settings (to allow a lower DC link voltage)

The THD of each inverter and the whole inverter park may be estimated by simulations. Based on such simulation results, a lowest allowed DC link voltage can be set. A corresponding firmware package can be created for and sent to each individual inverter. Can be used simultaneously with scenarios 1, 2, 3 and/or 5.

5) PV panel model→MPPT settings

The PV panel behavior may be simulated and an expected behavior in different places of the PV field (considering shadowing effects, for example) can be estimated. Based on such simulated results, the MPPT settings for each inverter can be computed and a corresponding firmware package may be created for and sent to each individual inverter.

6) Optimal droop factor of each inverter→Pre-defined of inverter drooping factors A voltage rise in the output of the inverter is a function of the location of the inverter in the transmission line. The effect is more distinct when the power factor is 1. Based on simulated results, an optimal droop factor can be computed and set for each inverter and/or the Q-compensation term can be calculated. A corresponding firmware package can be created for and sent to each individual inverter.

7) Optimal Q-compensation ratio→Pre-calculated set of the inverters are used for Q-compensation Not all the inverters are necessarily used for the Q-compensation. Based on simulations, a Q-mode firmware can be set to desired inverters to be used in the compensation. Only selected Q-compensation inverters are then used for the reactive power generation, while the rest of the inverters produce power. No PV panels are necessarily needed.

It should be noted that the simulation method used for the simulation of the electric power conversion system 10 in order to determine the optimal configuration for each one of the electric power converters 11 of the electric power conversion system may vary and depend on the type and characteristics of the electric power conversion system 10 and/or on the type and characteristics of the control arrangement 30, for example. Generally any known simulation methods, or programs therefor, that are able to determine the optimal configuration for each one of the electric power converters 11 of the electric power conversion system 10 could be used, for example. In the following, some examples are given on how the simulation can be carried out.

Figure 3:
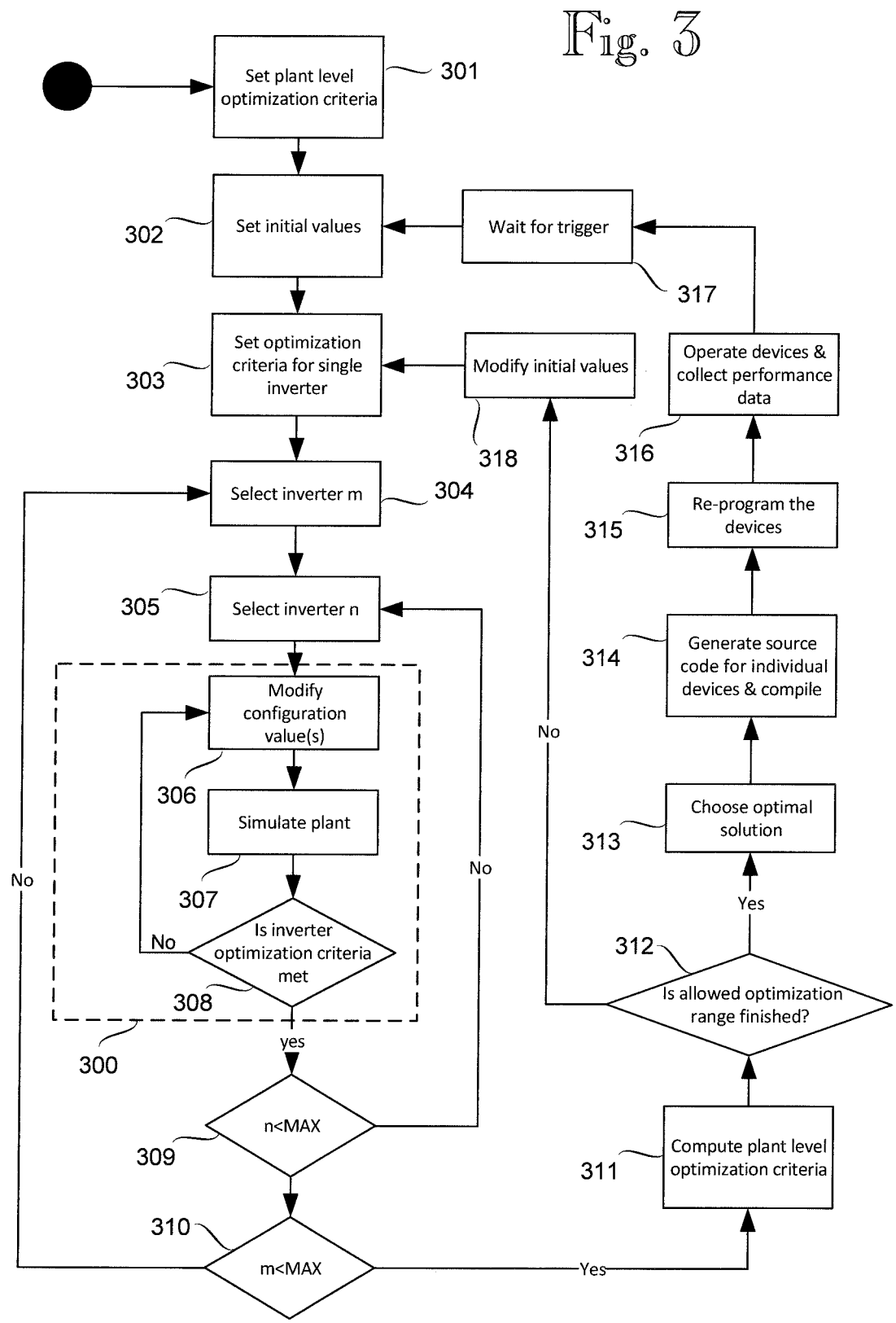
FIG. 3 is a flow diagram according to an embodiment.

FIG. 3 shows a flow diagram according to an embodiment. In the exemplary embodiment of FIG. 3 it is assumed that the power conversion system 10, such as a PV plant, is designed, or modelled, and simulated as an m times n matrix, where n is a row and m is a column of the electric power converters 11, such as an inverter, in such a system. First, plant level optimization criteria are set 301. This may comprise defining a cost function for a plant level optimization algorithm, where $$f_{plant}(x_1, x_2, x_3 \ldots x_n) \qquad (1)$$

is a multivariable cost function of the plant, and $$F=\{x \in R\} \qquad (2)$$

is the allowed range of the cost function, and x can get values from the defined range R.

Next, initial values are set 302. During this step the initial values for the simulation and optimization algorithm used are set. Historical data collected from the plant and/or from related plants can be used as additional known data as input parameters for the simulation. Optimization criteria are set 303 for a single inverter. This may comprise defining a cost function for the optimization algorithm, where $$f_{inverter}(x_1, x_2, x_3 \ldots x_n) \qquad (3)$$

is a multivariable cost function of a single inverter, and $$F=\{x \in J\} \qquad (4)$$

is the allowed range of the cost function, and x can get values from the defined range J.

Inverter m is selected 304, and the inverter matrix is started to go through starting from column m. Inverter n is selected 305, and the inverter column is started to go through starting from row n. Hence, loop 300 is preferably performed for each of the inverters. In the loop 300, first configuration value(s) is/are modified 306. This step may comprise modifying one or more operational values of the inverter based on the utilized optimization algorithm, for example. Then the plant is simulated 307 and simulated data is collected from inverter$_{m,n}$ for evaluating the optimization criteria. Inverter level cost function (3) may be calculated for this purpose. After this, it is evaluated 308 if the inverter optimization criteria are met. For example, is the inverter level optimization criteria met, or is the range of the inverter level optimization function inputs (4) fulfilled? If not, then it is returned back to step 306. If yes, it is checked 309 if the inverter is the last inverter in the row n and further it is checked 310 if the inverter is the last inverter in the column m. After all the inverters have been simulated in loop 300, plant level optimization criteria can be computed 311 comprising calculating a plant level cost function (1). It may be checked 312, whether the allowed optimization range is finished, i.e. allowed values of the vector x (2) finished. If not, then it is proceeded to step 318, where the initial values for the simulation and optimization may be modified, after which it may be proceeded back to step 303. If yes, an optimal solution may be chosen 313 based on the minimum value of the cost function (1) and hence an optimal configuration for each one of the inverters 11 of the plant 10. After this, a corresponding source code for a firmware can be generated 314 for the individual inverters which may comprise compiling the source code. The inverters 11 can then be re-programmed 315 with the resulting individual, i.e. device-specific, software configurations. The software configuration may hence be unique for each converter device. After the re-programming 315, the devices 11 can be operated 316 and performance data may be collected. For example, performance and environmental data may be collected from the devices 11 operating in the in the plant 10 to adjust the plant model and to generate updated initial values. The procedure can be repeated in response to a trigger 317. Such a trigger can be an external trigger or a time-based trigger, for example, to perform the plant level optimization.

Figure 4:
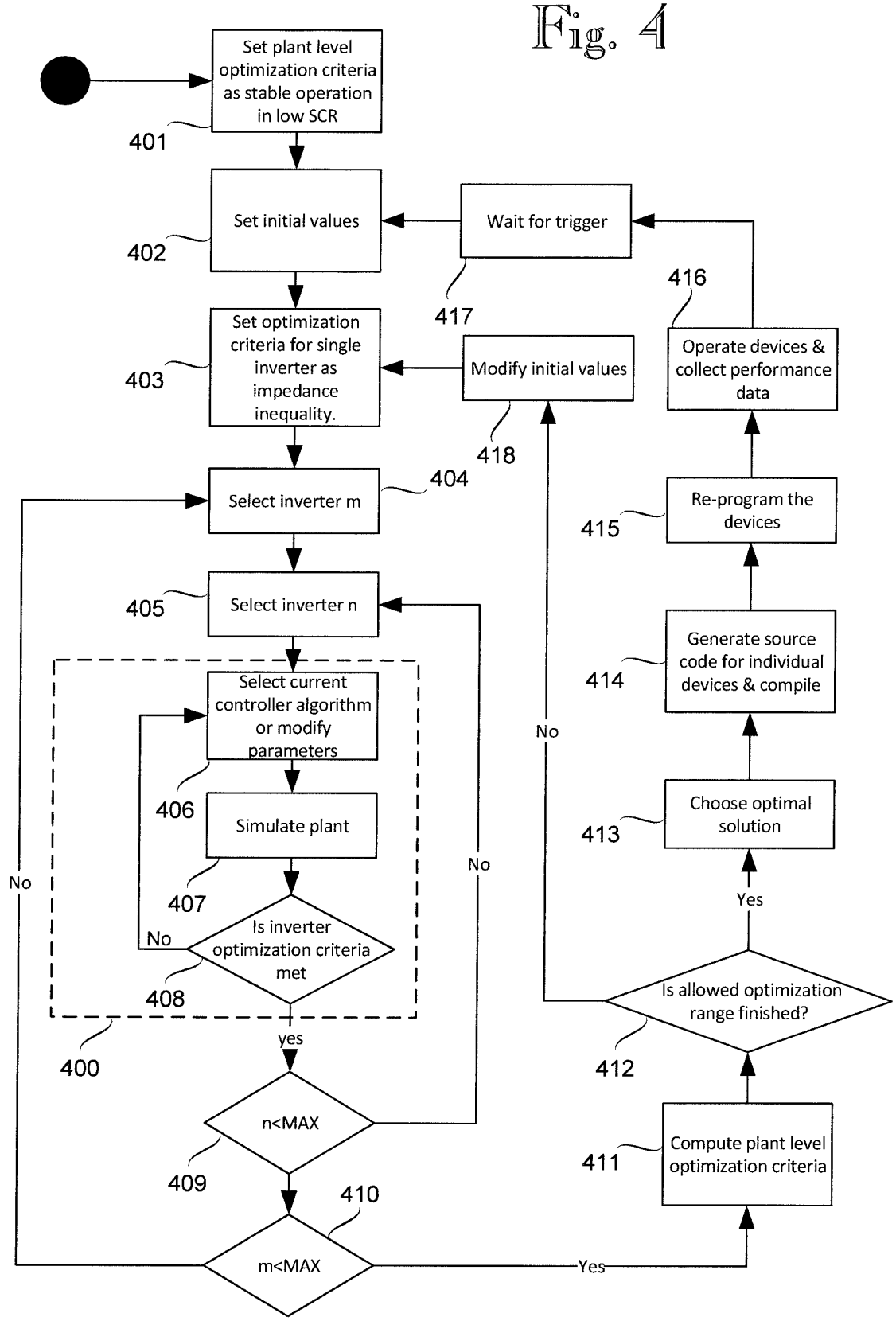
FIG. 4 is a flow diagram according to an embodiment.

FIG. 4 shows a flow diagram according to an embodiment. The embodiment of FIG. 4 is similar to the more general example of FIG. 3 but in the example of FIG. 4 a short circuit ratio and current controller algorithms are optimized in particular. In the exemplary embodiment of FIG. 4 it is again assumed that the power conversion system 10, such as a PV plant, is designed, or modelled, and simulated as an m times n matrix, where n is a row and m is a column of the electric power converters 11, such as an inverter, in such a system. First, plant level optimization criteria are set 401. This may comprise defining a cost function for a plant level optimization algorithm as an SCR (Short Circuit Ratio) level in the PCC (point of common coupling) of the plant, where the plant is able to operate stably. Next, initial values are set 402. During this step the initial values for the simulation and optimization algorithm are set. Historical data collected from the plant and/or from related plants can be used as additional known data as input parameters for the simulation. In this example, the initial value can be a well-known space vector control with existing values, for example. Other allowed values for current controller algorithm can be PR control, hysteresis control, and state-space control, for example. Optimization criteria are set 403 for a single inverter for a settling time for an active power step. The settling time is known to be related to a phase margin and therefore to the system stability. Inverter m is selected 404, and the inverter matrix is started to go through starting from column m. Inverter n is selected 405, and the inverter column is started to go through starting from row n. Hence, loop 400 is preferably performed for each of the inverters. In the loop 400, configuration value(s) is/are modified 406 first. This step may comprise changing the current control algorithm to another type (such as current vector control, PR-control, hysteresis control, and state space control). If all of the allowed tuning parameters for the controller are not tested, the parameters of the chosen controller are preferably modified. Then the plant is simulated 407 and simulated data is collected from inverter$_{m,n}$ for evaluating the inverter level cost function. After this, it is evaluated 408 if the inverter optimization criteria are met. For example, is the inverter level optimization criteria met, or is the range of the inverter level optimization function inputs (4) fulfilled? If not, then it is returned back to step 406. If yes, it is checked 409 if the inverter is the last inverter in the row n and further it is checked 410 if the inverter is the last inverter in the column m. After all the inverters have been simulated in loop 400, plant level optimization criteria can be computed 411 where the plant level SCR is simulated. It may be checked 412, whether the allowed optimization range is finished, i.e. allowed values of the vector x (2) finished. If not, then it is proceeded to step 418, where the initial values for the simulation and optimization may be modified, after which it may be proceeded back to step 403. If yes, an optimal solution may be chosen 413 based on the minimum value SCR and hence an optimal configuration for each one of the inverters 11 of the plant 10. After this, a corresponding source code for a firmware can be generated 414 for the individual inverters which may comprise compiling the source code. The inverters 11 can then be re-programmed 415 with the resulting individual software configurations. The software configuration may hence be unique for each inverter. After the re-programming 415, the devices 11 can be operated 416 and performance data may be collected. For example, performance and environmental data may be collected from the devices 11 operating in the in the plant 10 to adjust the plant model and to generate updated initial values. The procedure can be repeated in response to a trigger 417. Such a trigger can be an external trigger or a time-based trigger, for example, to perform the plant level optimization.

Figure 5:
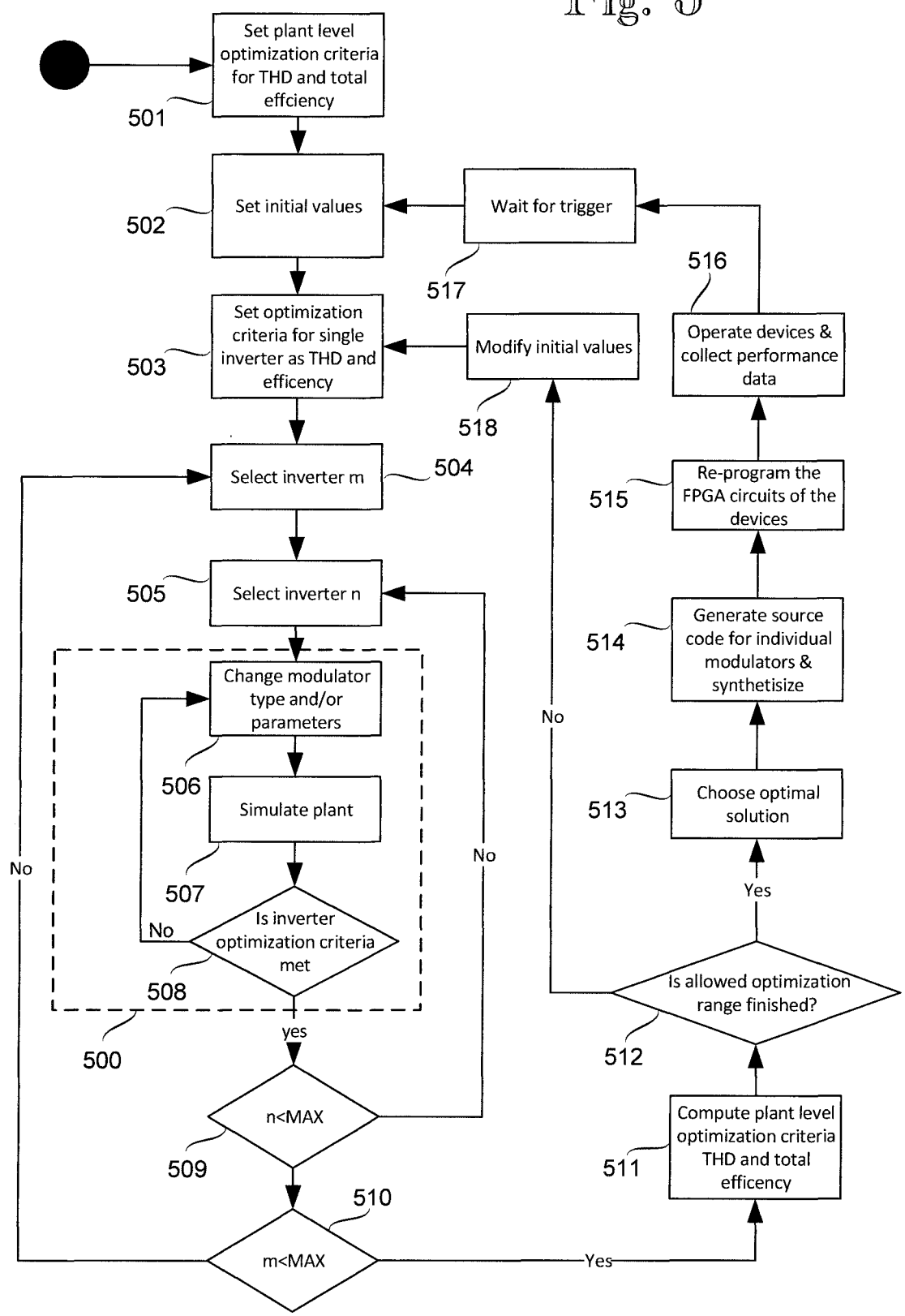
FIG. 5 is a flow diagram according to an embodiment.

FIG. 5 shows a flow diagram according to an embodiment. The embodiment of FIG. 5 is similar to the more general example of FIG. 3 but in the example of FIG. 5 the THD and total efficiency and modulation scheme are optimized in particular. In the exemplary embodiment of FIG. 5 it is again assumed that the power conversion system 10, such as a PV plant, is designed, or modelled, and simulated as an m times n matrix, where n is a row and m is a column of the electric power converters 11, such as an inverter, in such a system. First, plant level optimization criteria are set 501. This may comprise defining a cost function for a plant level optimization which includes the THD and the total plant level efficiency. Next, initial values are set 502. During this step the initial values for the simulation and optimization algorithm are set. Historical data collected from the plant and/or from related plants can be used as additional known data as input parameters for the simulation. Optimization criteria are set 503 for a single inverter. The cost function for a single inverter may be defined to include the THD and the efficiency in the output of the single inverter. Inverter m is selected 504, and the inverter matrix is started to go through starting from column m. Inverter n is selected 505, and the inverter column is started to go through starting from row n. Hence, loop 500 is preferably performed for each of the inverters. In the loop 500, configuration value(s) is/are modified 506 first. This step may comprise changing the type of the modulator, such as SVPWM (Space Vector Pulse Width Modulation), zero vector modified SVPWM variants, and/or other possible variants. In addition, operational parameters of the modulator may be changed, such as the modulation frequency. Then the plant is simulated 507 and simulated data is collected from inverter$_{m,n}$ for evaluating the THD and the efficiency and for calculating the inverter level cost function. After this, it is evaluated 508 if the inverter optimization criteria are met. For example, is the inverter level optimization criteria met, or is the range of the inverter level optimization function inputs fulfilled? If not, then it is returned back to step 506. If yes, it is checked 509 if the inverter is the last inverter in the row n and further it is checked 510 if the inverter is the last inverter in the column m. After all the inverters have been simulated in loop 500, plant level optimization criteria can be computed 511 where the plant level cost function is calculated. It may be checked 512, whether the allowed optimization range is finished, i.e. allowed values of the modulator and parameters finished. If not, then it is proceeded to step 518, where the initial values for the simulation and optimization may be modified, after which it may be proceeded back to step 503. If yes, an optimal solution may be chosen 513 based on the minimum value of the cost function and hence an optimal configuration for each one of the inverters 11 of the plant 10. After this, a corresponding source code for a firmware can be generated 514 for the individual inverters, which in this example comprises generating the source code using VHDL (Very High Speed integrated circuit Hardware Description Language) or Verilog, for example, for the modulators of the individual devices. The inverters 11 can then be re-programmed 515 with the resulting individual software configurations. In this example it may include re-programming FPGA circuits of the devices with the synthesized binary files generated in step 514, for example. The software configuration may hence be unique for each inverter. After the re-programming 515, the devices 11 can be operated 516 and performance data may be collected. For example, performance and environmental data may be collected from the devices 11 operating in the in the plant 10 to adjust the plant model and to generate updated initial values. The procedure can be repeated in response to a trigger 517. Such a trigger can be an external trigger or a time-based trigger, for example, to perform the plant level optimization.

The control arrangement 30 or other means performing any one of the embodiments herein, or a part or a combination thereof, may be implemented as one physical unit or as two or more separate physical units that are configured to implement the functionality of the various embodiments. Herein the term 'unit' generally refers to a physical or logical entity, such as a physical device or a part thereof or a software routine. The control arrangement 30 according to any one of the embodiments may be implemented at least partly by means of one or more computers 31 or corresponding digital signal processing (DSP) equipment provided with suitable software, for example. Such a computer or digital signal processing equipment preferably comprises at least a working memory (RAM) providing storage area for arithmetical operations, and a central processing unit (CPU), such as a general-purpose digital signal processor. The CPU may comprise a set of registers, an arithmetic logic unit, and a control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer 31 may also have an operating system which may provide system services to a computer program written with the program instructions. The computer 31 or other apparatus implementing the invention, or a part thereof, may further comprise suitable input means for receiving e.g. user commands and measurement and/or control data, and output means for outputting e.g. control or other data. It is also possible to use a specific integrated circuit or circuits, or discrete electric components and devices for implementing the functionality according to any one of the embodiments.

If at least part of the functionality of the invention is implemented by software, such software may be provided as a computer program product comprising computer program code which, when run on a computer, causes the computer or corresponding arrangement to perform the functionality according to the embodiments as described herein. Such a computer program code may be stored or generally embodied on a computer readable medium, such as suitable memory, e.g. a flash memory or an optical memory, from which it is loadable to the unit or units executing the program code. In addition, such a computer program code implementing the invention may be loaded to the unit or units executing the computer program code via a suitable data network, for example, and it may replace or update a possibly existing program code.

It will be obvious to a person skilled in the art that, as the technology advances, the inventive concept can be implemented in various ways. The invention and its embodiments are not limited to the examples described above but may vary within the scope of the claims.

The invention claimed is:

1. A method for controlling an electric power conversion system comprising a plurality of electric power converters, the method comprising:
   a) collecting data related to the electric power conversion system, wherein the collected data related to the electric power conversion system comprises data of an electric system supplied by the electric power conversion system comprising a grid impedance;
   b) determining an optimal configuration for each one of the electric power converters of the electric power conversion system on a basis of the collected data through a simulation of the electric power conversion system, wherein the determined configuration for each one of the electric power converters comprises a droop factor and current controller parameters;
   c) generating, for each one of the electric power converters, a firmware of the electric power converter on a basis of the determined optimal configuration for the respective electric power converter; and
   d) re-programming each one of the electric power converters with the respective firmware generated for the respective electric power converter.

2. The method of claim 1, comprising running the electric power conversion system at least during step a) and after step d).

3. The method of claim 1, wherein the optimal configuration for each one of the electric power converters of the electric power conversion system optimizes a power output of the electric power conversion system.

4. The method of claim 1, wherein the collected data related to the electric power conversion system further comprises at least one of: data of the electric power conversion system, and data of an electric system supplying the electric power conversion system.

5. The method of claim 1, wherein the collected data comprises measured data.

6. The method of claim 1, wherein the configuration for the electric power converter comprises at least one of: one or more operational values of the converter, a current controller type of the converter, and a modulator type of the converter.

7. The method of claim 1, wherein the re-programming of each one of the electric power converters comprises re-programming a controller of each one of the electric power converters.

8. The method of claim 1, wherein steps a) to d) are performed at predetermined intervals and/or in response to one or more predetermined conditions being fulfilled.

9. A computer program product comprising computer program code embodied on a non-transitory computer readable medium, wherein execution of the program code in a computer causes the computer to carry out the steps of the method according to claim 1.

10. A control arrangement for an electric power conversion system comprising a plurality of electric power converters, the control arrangement being configured to:
    collect data related to the electric power conversion system, wherein the collected data related to the electric power conversion system comprises data of an electric system supplied by the electric power conversion system comprising a grid impedance;
    determine an optimal configuration for each one of the electric power converters of the electric power conversion system on a basis of the collected data through a simulation of the electric power conversion system, wherein the determined configuration for each one of the electric power converters comprises a droop factor and current controller parameters;
    generate, for each one of the electric power converters, a firmware of the electric power converter on a basis of the determined optimal configuration for the respective electric power converter; and
    re-program each one of the electric power converters with the respective firmware generated for the respective electric power converter.

11. The control arrangement of claim 10, wherein the optimal configuration for each one of the electric power converters of the electric power conversion system optimizes a power output of the electric power conversion system.

12. The control arrangement of claim 10, wherein the collected data related to the electric power conversion system further comprises at least one of: data of the electric power conversion system, and data of an electric system supplying the electric power conversion system.

13. The control arrangement of claim 10, wherein the control arrangement is configured to collect data by measuring and/or receiving data.

14. The control arrangement of claim 10, wherein the configuration for the electric power converter comprises at least one of: one or more operational values of the converter, a current controller type of the converter, and a modulator type of the converter.

15. The control arrangement of claim 10, wherein the control arrangement is configured to re-program a controller of each one of the electric power converters.

16. An electric power conversion system comprising a plurality of electric power converters and the control arrangement as claimed in claim 10.

17. An apparatus for configuring an electric power conversion system comprising electric power converters, the apparatus comprising a processor and a memory storing instructions that, when executed by the processor, cause the apparatus to:
  collect data related to the electric power conversion system, wherein the collected data related to the electric power conversion system comprises data of an electric system supplied by the electric power conversion system comprising a grid impedance;
  determine an optimal configuration for each one of the electric power converters of the electric power conversion system on a basis of the collected data through a simulation of the electric power conversion system, wherein the determined configuration for each one of the electric power converters comprises a droop factor and current controller parameters;
  generate, for each one of the electric power converters, an individual firmware of the electric power converter on a basis of the determined optimal configuration for the respective electric power converter; and
  re-program each one of the electric power converters with the respective individual firmware generated for the respective electric power converter.

* * * * *